Figure 1:
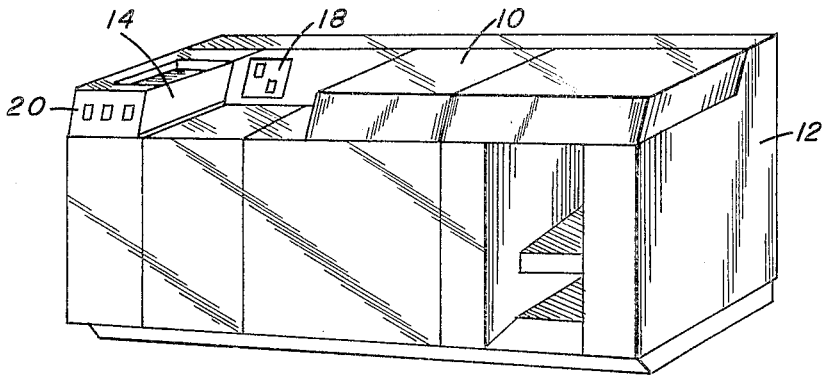
Figure 3:
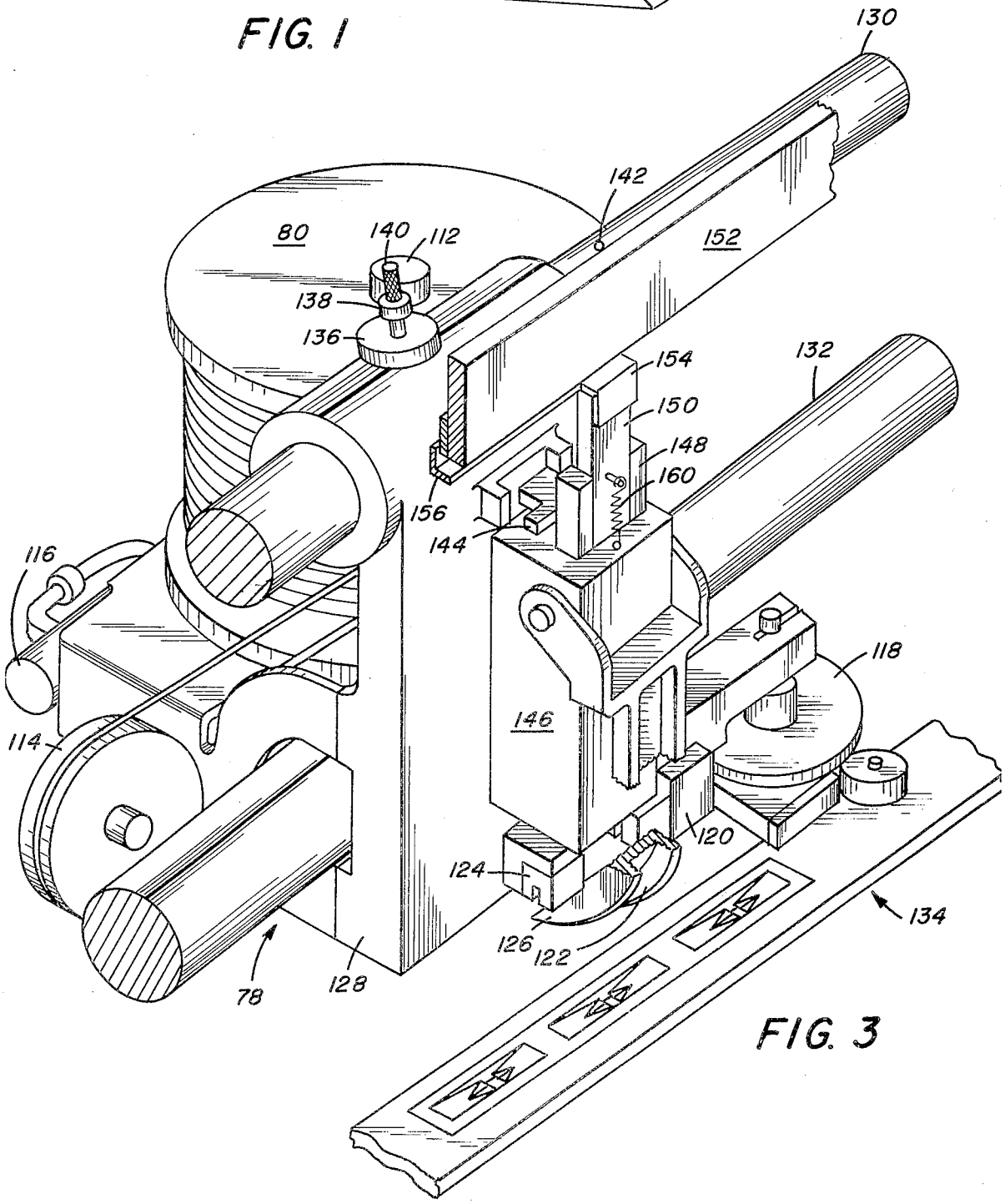
Figure 2:
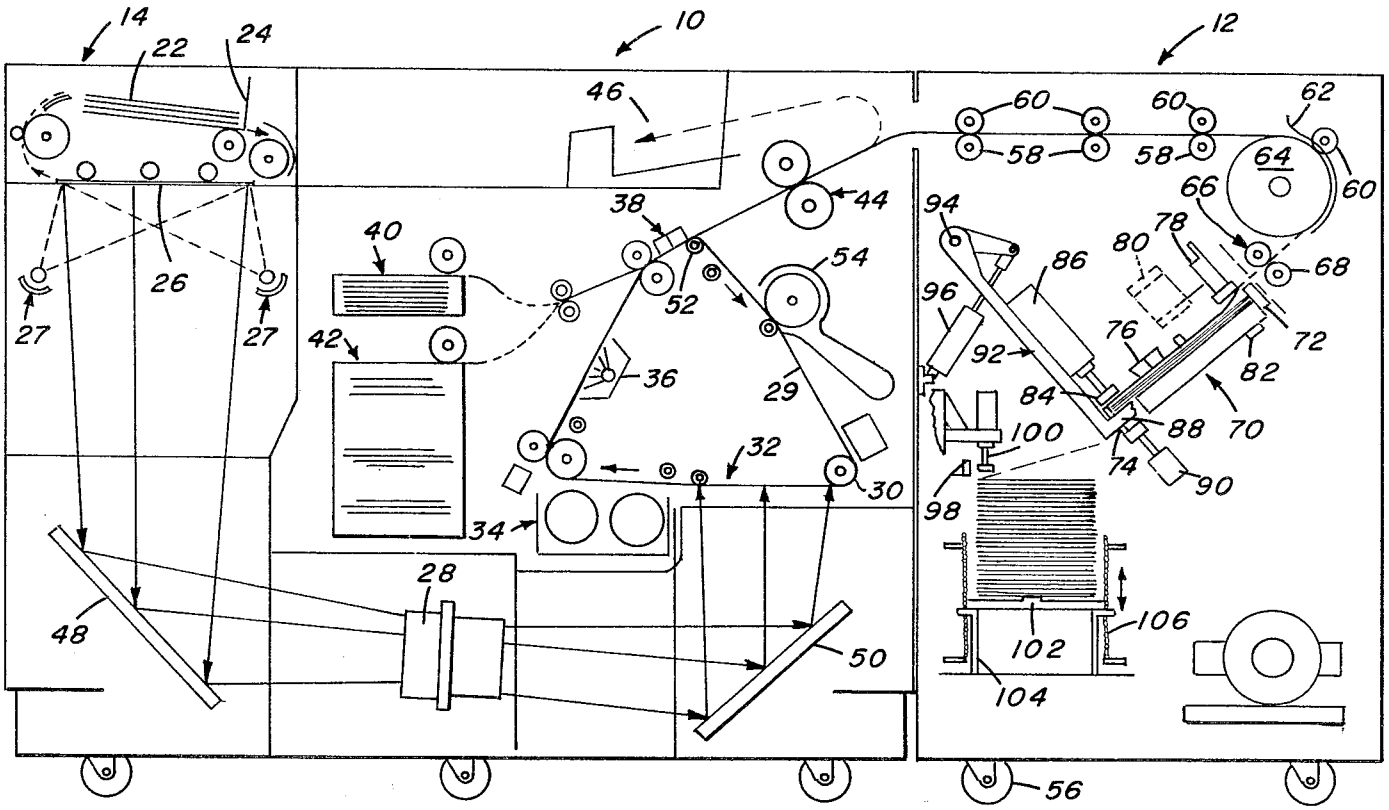
Figure 4:
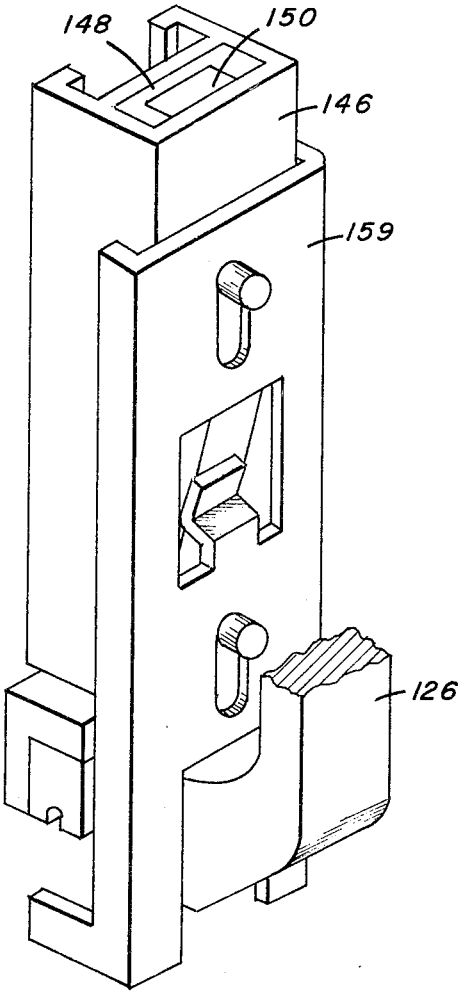
Figure 5:
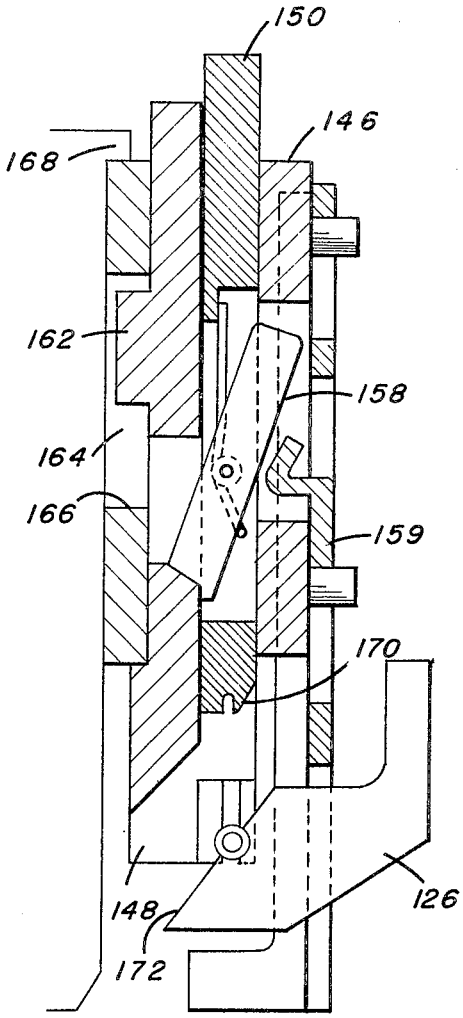
Figure 6:
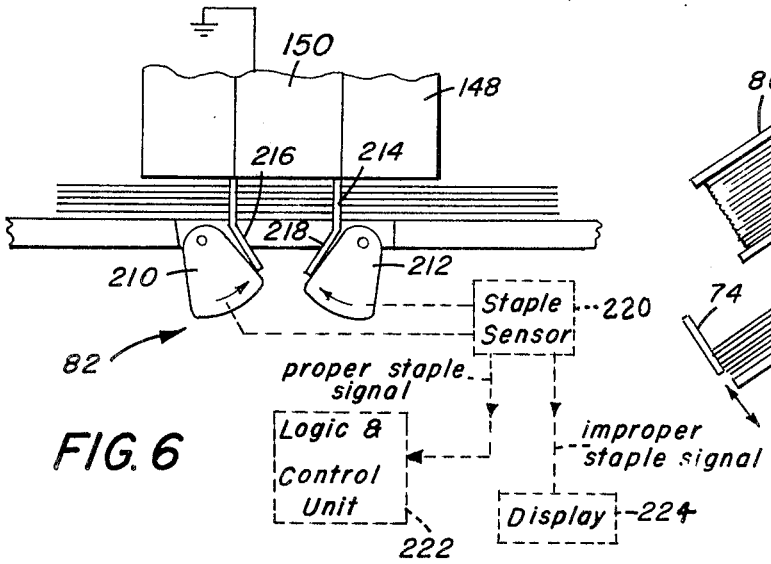
Figure 7:
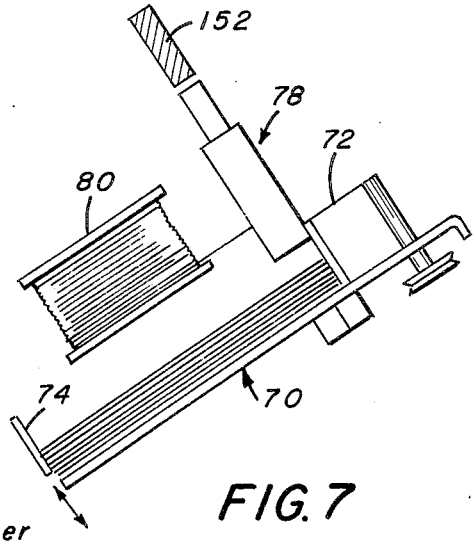
Figure 8:
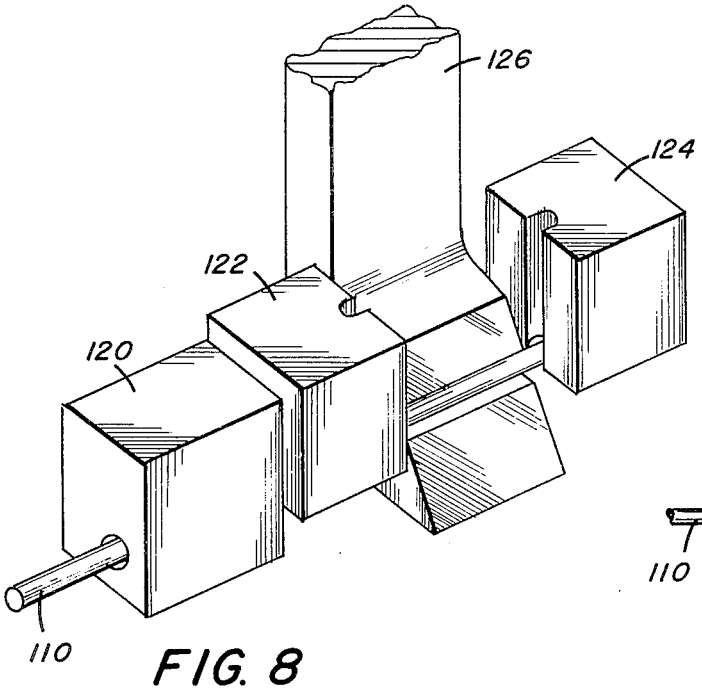
Figure 8A:
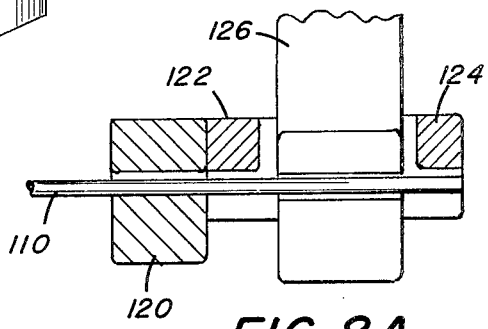
Figure 9:
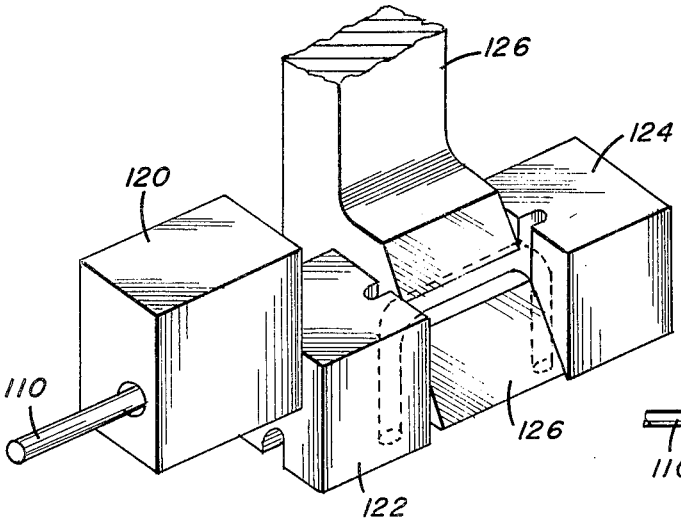
Figure 9A:
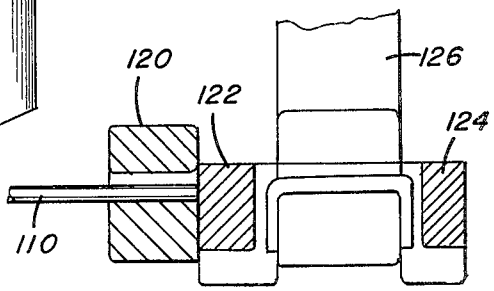
Figure 10:
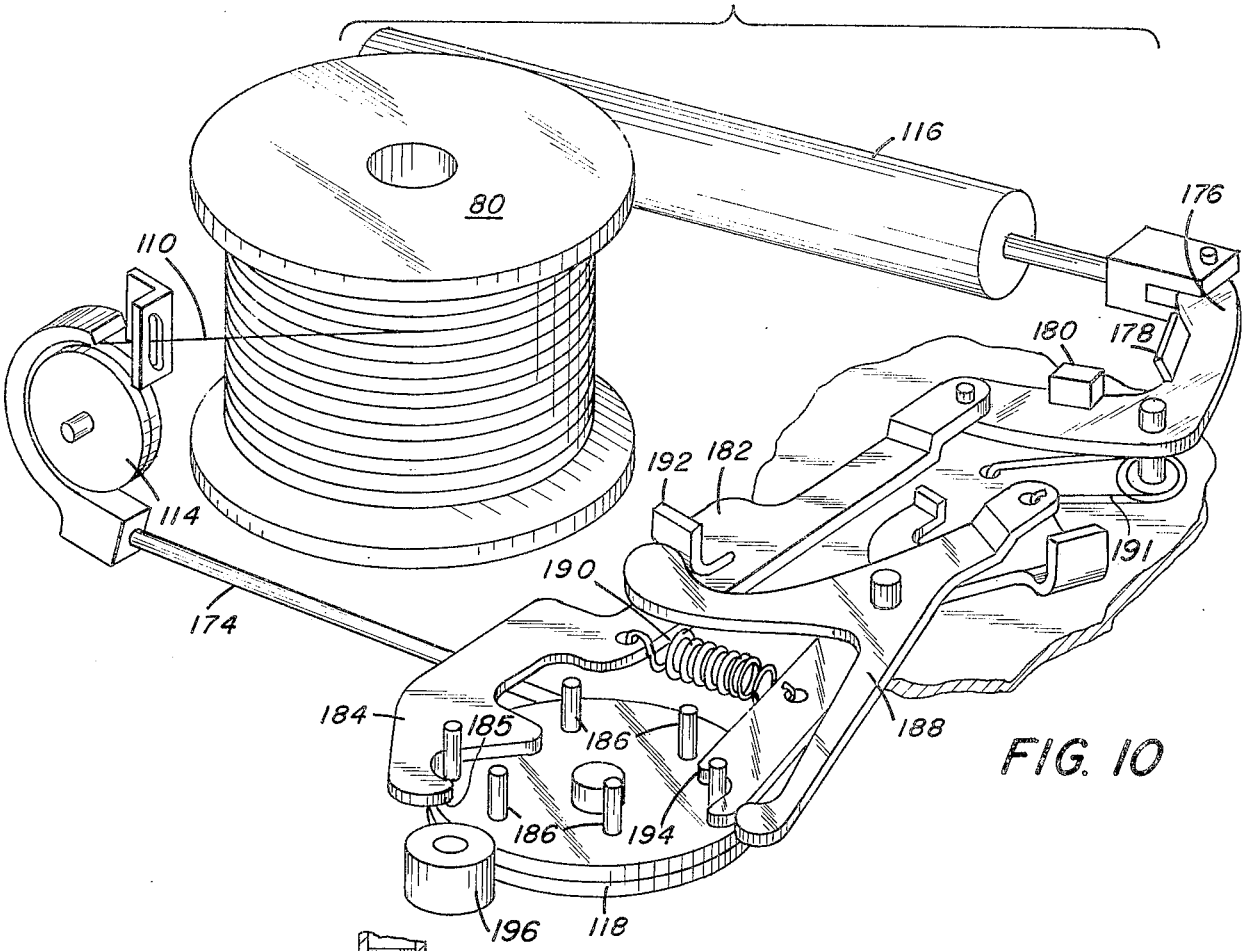
Figure 12:
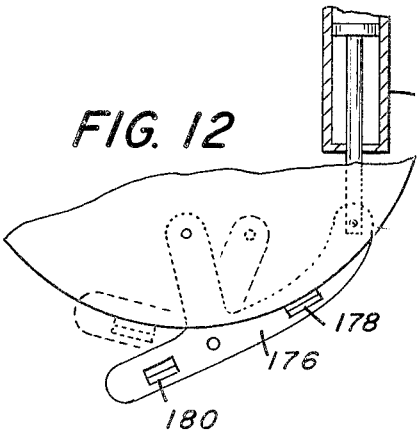
Figure 11:
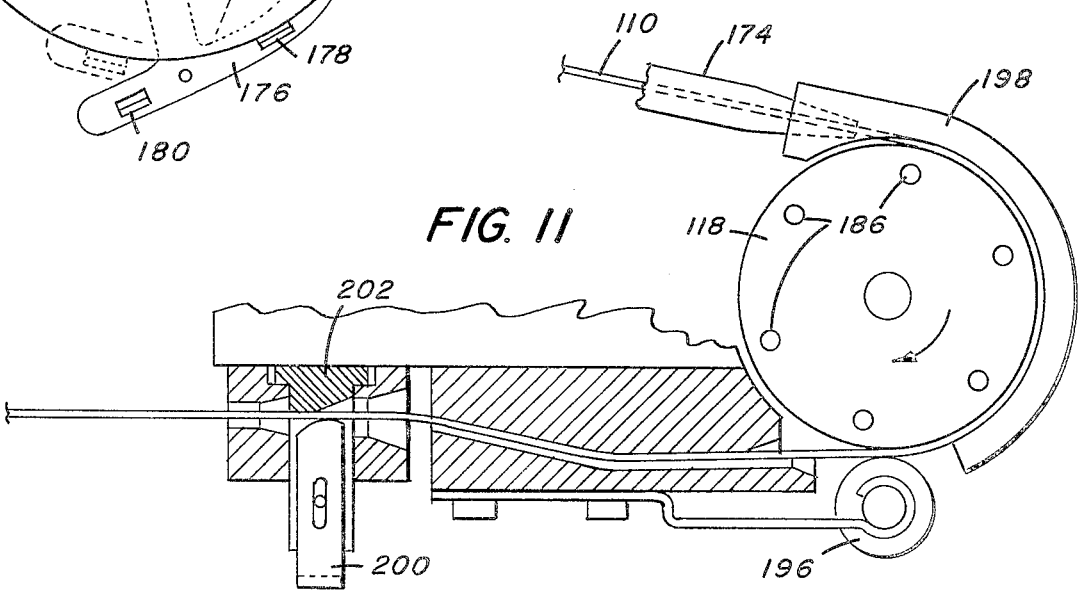

United States Defensive Publication [19] (H) [11] T958,003

Russel et al. [43] May 3, 1977

[54] STAPLE SENSING APPARATUS

[76] Inventors: Matthew Jouette Russel; John Frederick Hartman, both of 343 State St., Rochester, N.Y. 14650

[21] Appl. No.: 671,841

[22] Filed: Mar. 30, 1976

[51] Int. Cl.[2] ..... B27F 7/08

[52] U.S. Cl. ..... 227/1; 227/2

[57] ABSTRACT

In a finisher for finishing sets of copy sheets by stapling the sets into stapled booklets, staple sensing apparatus for sensing whether or not a staple has been properly driven, through the set of sheets. If a staple has been properly driven the legs of the staple effect an electrical continuity between staple clinchers. The electrical continuity is sensed and a first signal is produced indicative of a proper staple to permit continued operation of the finisher and electrographic apparatus to which it is attached. If an electrical discontinuity is sensed, a second signal is produced indicative of an improper staple and a display is actuated to indicate this condition to the operator.

No Claims, 5 Sheets Drawing,

18 Pages Specification

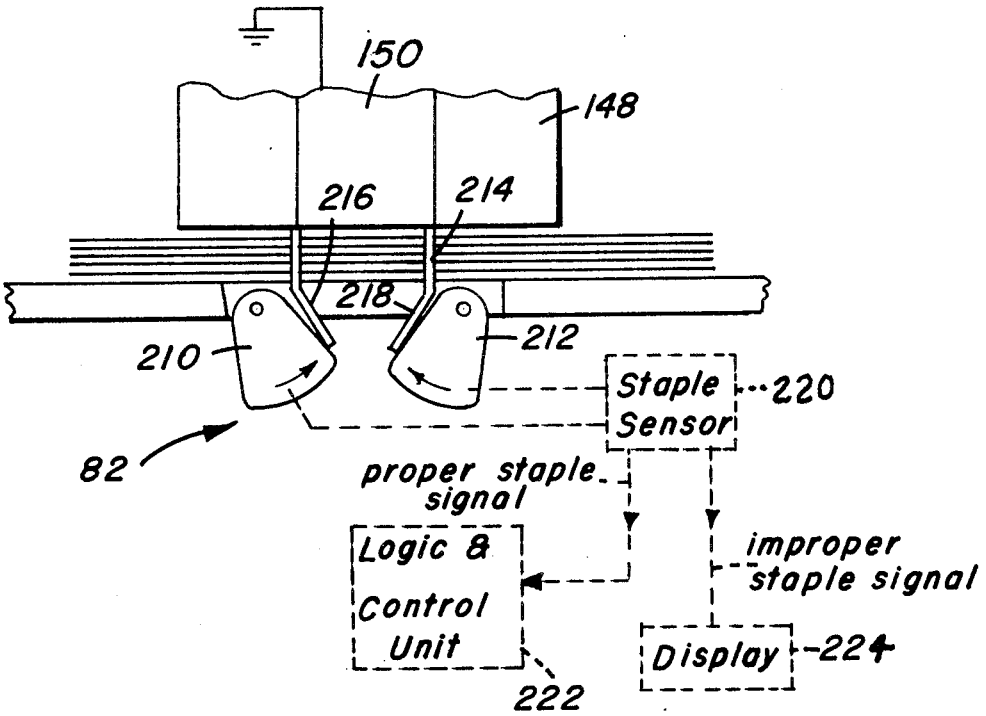

The file of this unexamined application may be inspected and copies thereof may be purchased (849 O.G. 1221, Apr. 9, 1968).